United States Patent

[11] 3,609,244

[72] Inventor Frank W. Mounts
Colts Neck, N.J.

[21] Appl. No. 886,324
[22] Filed Dec. 18, 1969
[45] Patented Sept. 28, 1971
[73] Assignee Bell Telephone Laboratories Incorporated
Murray Hill, N.J.

[54] CONDITIONAL REPLENISHMENT VIDEO SYSTEM WITH VARIABLE LENGTH ADDRESS CODE
16 Claims, 7 Drawing Figs.

[52] U.S. Cl. ........ 179/15.55 R, 179/15 BW, 178/DIG. 3
[51] Int. Cl. ........ H04b 1/66
[50] Field of Search ........ 179/15 BW, 15.55; 178/6.8, 6, DIG. 3; 325/38 B

[56] References Cited

UNITED STATES PATENTS

| | | | |
|---|---|---|---|
| 3,403,226 | 9/1968 | Wintringham | 179/15.55 R |
| 3,553,361 | 1/1971 | Mounts | 179/15.55 R |

*Primary Examiner*—Kathleen Claffy
*Assistant Examiner*—John Bradford Leaheey
*Attorneys*—R. J. Guenther and E. W. Adams, Jr.

ABSTRACT: The amplitude of a sample from a signal having frame-to-frame redundancy is transmitted only if the amplitude differs significantly from the amplitude of a corresponding sample having the same time position in a previous frame interval. An address word is assigned to each sample to indicate the position of that sample within a group of samples. Group synchronization is maintained between the transmitter and receiver by forcibly transmitting the last sample in each group whether or not that sample represents a significant change. The value of each address word indicates the length of the interval between the location of its respective sample and the end of the group. Only those bits of an address word which are necessary to locate the sample in the interval between the last-transmitted sample and the end of the group are transmitted to the receiving location. A control word whose bit values indicate which bits of the next address word must be transmitted is developed from each address word and is stored until the next selected address word in response to an indication that its corresponding address word has been selected for transmission.

INVENTOR
F. W. MOUNTS
BY Daniel D. Dubosky
ATTORNEY

CONDITIONAL REPLENISHMENT VIDEO SYSTEM WITH VARIABLE LENGTH ADDRESS CODE

BACKGROUND OF THE INVENTION

This invention relates to redundancy reduction systems. In redundancy reduction systems the input signal is sampled at a constant rate and samples are then selected for transmission based on a comparison of each sample with a previously stored value or reference signal.

Redundancy reduction systems work particularly well with input signals having a large amount of redundancy between adjacent framed intervals. Each new sample is compared with a previously stored sample having the same time location in the frame interval, and the new sample is selected for transmission if it represents a significant change in amplitude for that time location in the frame interval. One frame memory storing representative amplitudes for all of the sampling points in a frame interval provides a source of previously stored samples in the transmitting location and another frame memory provides a source of a continuous signal in the receiving location. The receiver frame memory is of course updated by each sample selected for transmission.

Examples of these type systems can be found in telemetry where an input signal is derived by sampling a plurality of telemetry sensors, and each new sample is compared with the value which its sensor had during a previous sampling. Such a system is described in the 1962 *Proceedings of the National Telemetering Conference*, May 1962, Article 3-2, pages 1 through 14. Since the samples which are selected for transmission in this type of system occur at random, some means or method of identifying the location of the transmitted sample within the framed interval must be utilized. In prior art telemetry systems each telemetering sensor is assigned an address, and the proper address is transmitted with each selected sample to indicate to the receiver which one of the telemetering signal outputs has changed and should therefore be updated.

The redundancy reduction technique was applied to a video signal in a system described in my copending application entitled "Redundancy Reduction System for Video Signals," Ser. No. 749,770, filed Aug. 2, 1968, now U.S. Pat. No. 3,571,505. In this system, samples are taken at a constant rate from an input video signal. A frame memory in both the transmitting and receiving locations is utilized to store amplitude values for each of the sampled spatial points within an entire video frame. The amplitude for each sample is compared with the previously stored sample corresponding to the same spatial point, that is, to the same time location within the video frame interval, in order to determine whether or not the new sample should be transmitted. Only if the new sample represents a significant change in amplitude for its respective spatial point is that sample transmitted to the receiving location.

In the system described in my above-identified copending application, the number of bits required for addressing purposes is considerably reduced in accordance with the described invention by transmitting as an address the line location only of the transmitted video sample. Line synchronization is maintained between the transmitting and receiving locations by forcibly transmitting the first sample in each video line whether or not that sample represented a significant change in amplitude.

Still other techniques for decreasing the number of bits required for addressing purposes were described in my copending applications entitled "Conditional Replenishment Video System with Run Length Coding of Position" and "-Conditional Replenishment Video System with Sample Grouping," Ser. Nos. 820,537 and 820,552, both filed Apr. 30, 1969 now, respectively U.S. Pat. No. 3,553,362 and 3,553,361. In these last-mentioned applications, advantage was taken of the fact that changes in a video signal from one frame to the next tend to occur in clusters. Accordingly, in the systems described in these applications samples are transmitted in groups along with a single address word and code or flag word to indicate to the receiver the length or end of the transmitted group. Nevertheless, in all of the above-mentioned copending applications, as in all other prior art redundancy reduction systems, the length of the address word is maintained as a constant regardless of the position of the transmitted sample within the framed interval.

SUMMARY OF THE INVENTION

One object of the present invention is to further reduce the number of bits required for addressing purposes in a redundancy reduction type system. This object and others are achieved in accordance with the present invention wherein the number of bits transmitted as the address word for a sample selected for transmission depends on the location of the last transmitted sample within the address group. Addresses are assigned to the samples in accordance with the position of the sample from the end of the address group, the lowest valued address word being assigned to the last sample in the address group with the highest valued address word being assigned to the first sample in the address group. After a first sample has been transmitted from an address group of samples, the number of bits utilized to transmit the next address location is equal to the number of bits necessary to indicate the location of that next sample between the last transmitted sample and the end of the address group. As samples from positions closer and closer to the end of the group are transmitted, fewer bits are required to indicate the address location of the next transmitted sample. In accordance with the present invention, means responsive to the address word of a transmitted sample are provided for developing and storing a control word which indicates by its bit content those bits of the next address word which are necessary to locate properly the next sample in the address group. This control word is then utilized to control or determine the bits of the next address to be coupled to the receiving location. The last sample in the address group is forcibly transmitted whether or not the sample represents a significant change in order to maintain synchronization between the transmitting and receiving locations.

BRIEF DESCRIPTION OF THE DRAWINGS

The invention will be more readily understood after reading the following detailed description in conjunction with the drawings, in which.

DETAILED DESCRIPTION

Figures 1, 6:
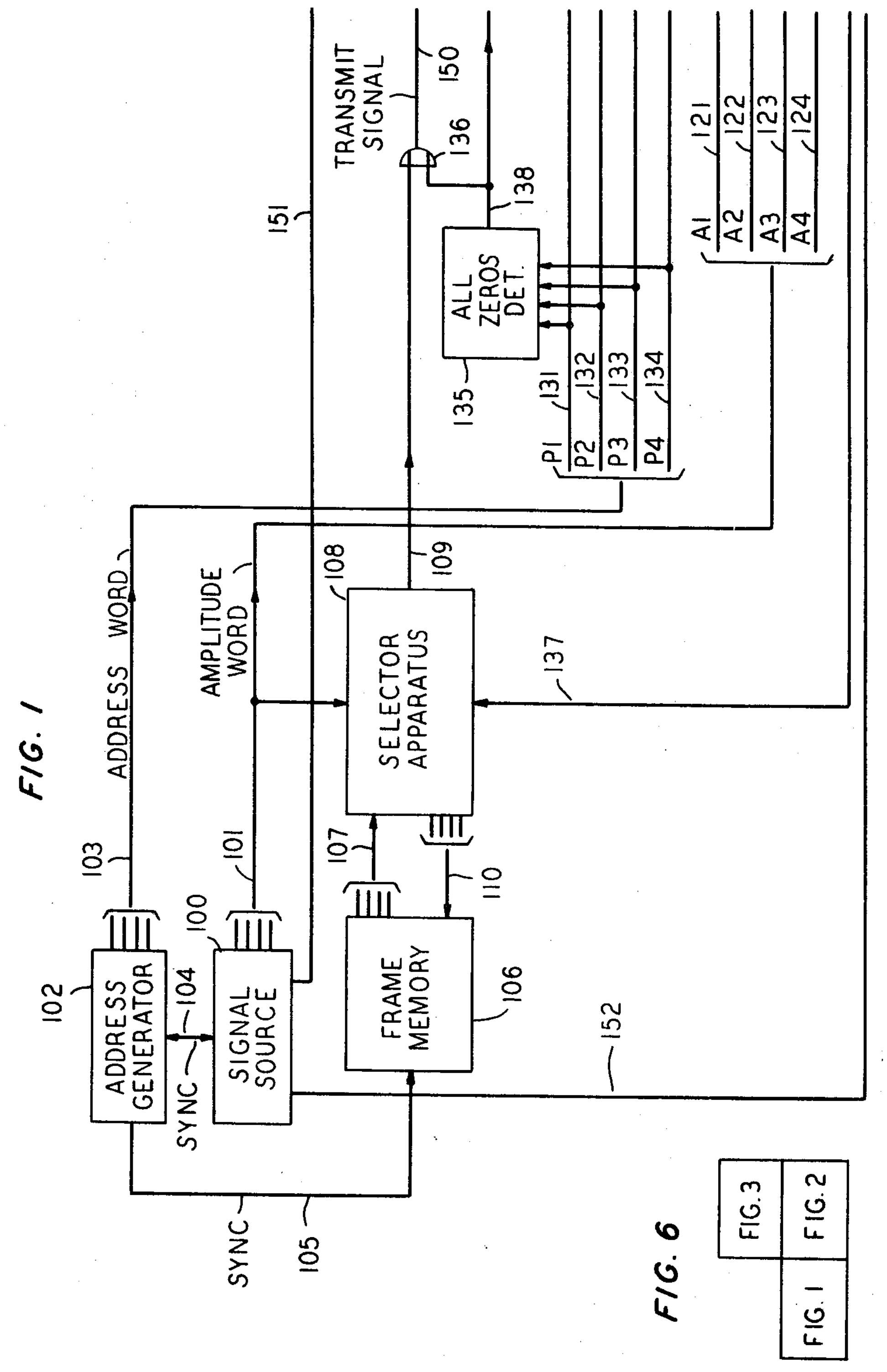
FIGS. 1, 2 and 3 when arranged in the pattern shown in FIG. 6 provide a schematic block diagram of a transmitting apparatus constructed in accordance with the present invention.

In FIG. 1, four-bit digital words are sequentially provided on bus 101 at the output of a signal source 100. These digital words on bus 101 indicate by their values the amplitudes of the samples taken at a constant rate of an input signal within source 100. The input signal in source 100 is the type of signal which may be divided in time into frame intervals each of which contains redundant information with respect to a previous frame interval.

Simultaneously with the appearance of each digital word on bus 101, a digital word is provided by an address generator 102 on bus 103. The value of each digital word on bus 103 represents the magnitude of the interval between its corresponding sample on bus 101 and the end of an address group of samples. Buses 101 and 103, like all other lines in the drawing referred to hereinafter as buses, are actually constructed of a plurality of transmission paths, one path for each of the bits said to be present within the digital word transmitted over a respective bus. As indicated hereinabove, the address group, or group of all possible addresses, may in some cases correspond to all of the sampling points within a frame interval but in other cases may correspond to all of the sampling points within a subinterval (such as a video line) of the frame interval. In the latter cases, subinterval synchronization must of course be maintained between transmitting and receiving locations. In the case of a telemetry system each address in the address group would most usually indicate a single telemetry sensor at the input of source 100. In the case of a video system each address in the address group may indicate the spatial point location of its corresponding sample within the video frame interval. Alternatively, each address in the address group in a video system may indicate the spatial point location of its corresponding sample within a single video line. In the latter instance some form of line synchronization must be maintained between the transmitting and receiving locations.

In order to insure that a given digital word on bus 103 will always indicate the same time location within the frame interval of the signal provided by source 100, a synchronization line 104 is provided between source 100 and address generator 102. This synchronization may originate in either the location of source 100 or within address generator 102.

Each digital word on bus 101 representing the amplitude of a single sample is connected to one input of a selector apparatus 108. A second digital word whose value represents the amplitude for the same spatial point within a previous frame interval is provided by way of bus 107 to a second input of selector apparatus 108. To insure that the proper digital word representing the same spatial point within the frame interval is provided by frame memory 106, synchronization is provided to memory 106 from address generator 102 by way of line 105.

Selector apparatus 108 compares the two digital words presented at its inputs on buses 101 and 107 in order to determine whether a significant difference exists between the amplitudes represented by the two digital words. Usually the comparison is made by taking the difference between the two digital words and comparing the absolute magnitude of that difference with a threshold level. If the absolute magnitude of the difference exceeds the threshold level, the difference is deemed to be significant and an energizing signal is produced on line 109. If, however, the absolute magnitude of the difference is less than the threshold level, the difference is deemed to be not significant and an energizing signal is not produced on line 109. The threshold level may be a variable whose value is changed in accordance with the digital word provided on bus 137 in a manner to be described hereinafter.

If the difference between the two amplitudes is judged to be significant, the digital word from bus 101 representing the new amplitude for that spatial point within the address group is coupled by way of bus 110 into frame memory 106. If, however, the difference is deemed to be not significant, the digital word from bus 107 representing a previous amplitude for that same spatial point within the frame interval is coupled by way of bus 110 into frame memory 106. In this way amplitudes for every spatial point within the frame interval are constantly available at the output of frame memory 106, and the amplitude value for a spatial point within memory 106 is updated with a new amplitude only when that new amplitude has been deemed to represent a significant change and has therefore been selected for transmission to the receiving location.

As indicated in FIG. 1, bus 101 is constructed of four transmission paths or lines, 121, 122, 123 and 124, carrying the digital bits A1, A2, A3 and A4, respectively, with A1 representing the most significant bit and A4 representing the least significant bit of the digital word on bus 101. Similarly, bus 103 is constructed of four transmission paths, 131, 132, 133 and 134, carrying the digital bits P1, P2, P3 and P4, respectively, with P1 representing the most significant bit and P4 representing the least significant bit. Each of the lines 131 through 134 is connected to the input of an all-zeros detector 135. When the address digital word on bus 103 represents that the last sample within an address group is presently being considered by the selector apparatus 108, that is, when all of the bits of the address digital word are identically equal to the logical "0," all zeros detector 135 produces an energizing signal on line 138. This energizing signal on line 138 is connected to one input of an OR gate 136 the other input of which is connected to line 109. Consequently, an energizing signal is provided on line 150 at the output of OR gate 136, wither when the all-zeros address digital word is present on bus 103 or when a sample is selected for transmission by virtue of the fact that it represents a significant change in amplitude. This energizing signal on line 150 indicates to the remaining apparatus that the sample presently available on bus 101 should be transmitted to the receiving location. The energizing signal on linc 150, plus the energizing signal on line 138 which indicates that the last sample within an address grouping is presently being considered, plus the address and amplitude digital words on buses 103 and 101, respectively, are all coupled to the apparatus shown in FIGS. 2 and 3.

Figure 2:
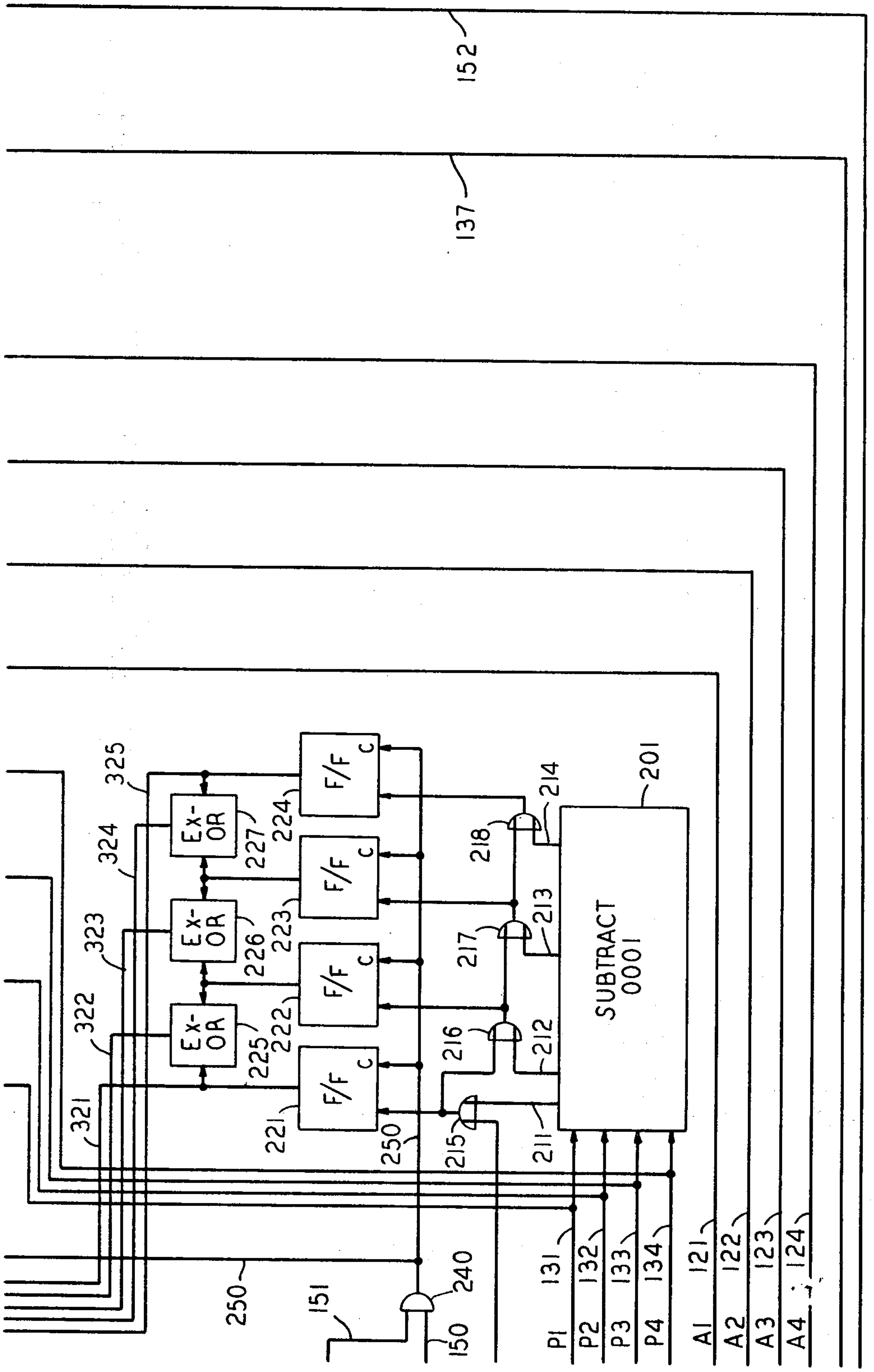
Figure 3:
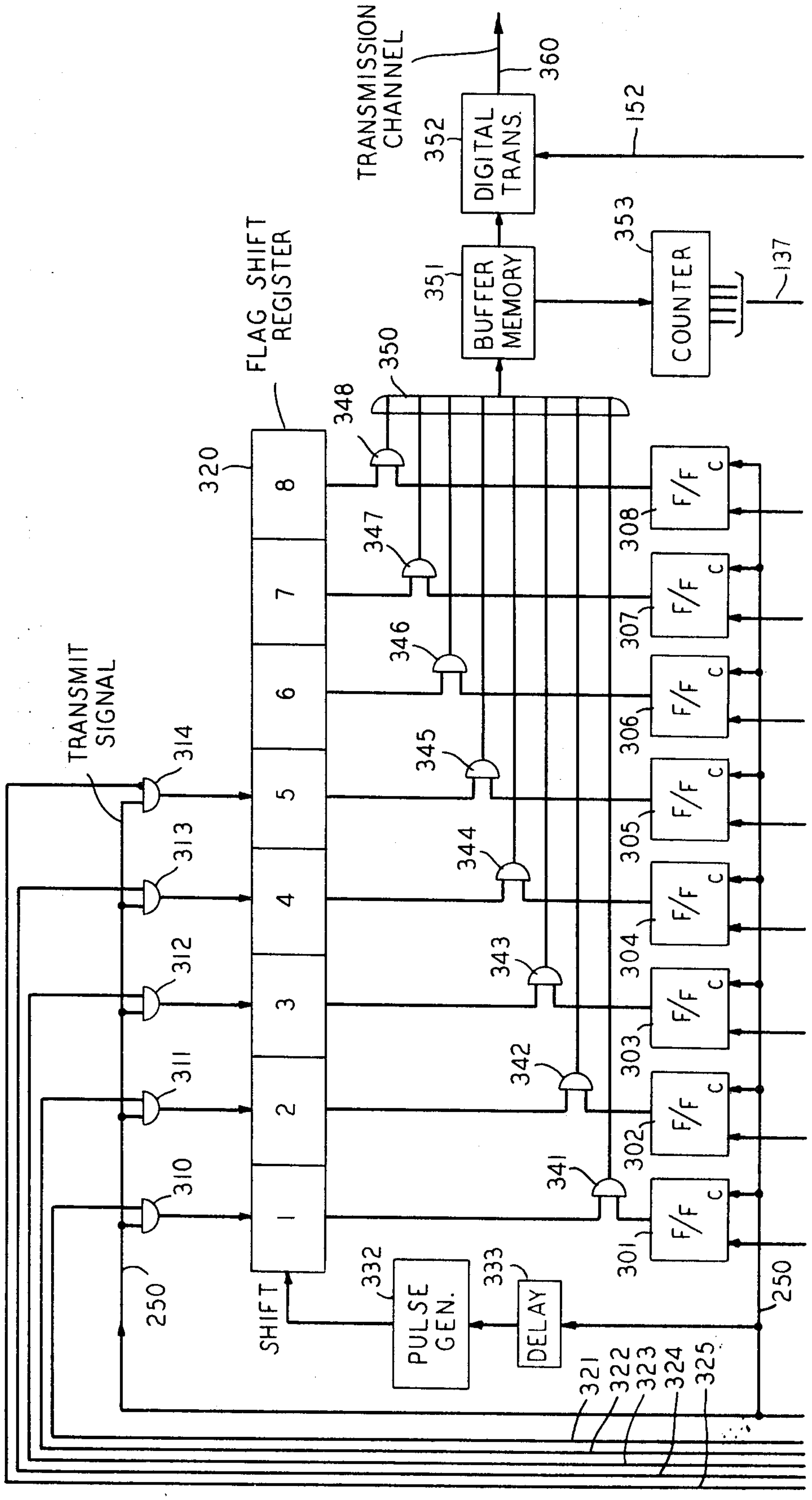

In FIGS. 2 and 3, the address word bits on lines 131 through 134 are coupled to the inputs of data flip-flops 305 through 308, respectively. All data flip-flops in the present embodiment are of the type known to those skilled in the art as type "D" flip-flops of the kind, for example, available from Motorola, Inc., under the number MC 1034.

When an energizing signal is present on line 150, one input of an AND gate 240 is energized. The other input of AND gate 240 is connected by way of line 151 to the signal source 100. An energizing pulse is provided on line 151 during each sampling interval, i.e., during each interval that an amplitude word is presented on bus 101. The pulse on line 151 need only be delayed with reference to the initial presentation of an amplitude word on bus 101 a period of time long enough to ensure that an energizing signal on line 150 has had a sufficient amount of time to develop.

During any sampling interval when AND gate 240 is energized by an energizing signal on line 150, the energizing pulse on line 151 is coupled through AND gate 240 by way of line 250 to the clock inputs of data flip-flops 301–308. When the clock inputs of data flip-flops 301–308 are energized, the digital bit present on each of the lines 131–134 and lines 121–124 is coupled or written into its respective data flip-flop. As a result, the address word is then stored in data flip-flops 301–304 and the amplitude word is stored in data flip-flops 305–308.

The remainder of the apparatus shown in FIG. 2 can best be described by first considering the information illustrated in the following table:

| Address Word | No. of Bits Required in Next Address | Control Word for Next Address |
|---|---|---|
| 1111 | 4 | 1111 |
| 1110 | 4 | 1111 |
| 1101 | 4 | 1111 |
| 1100 | 4 | 1111 |
| 1011 | 4 | 1111 |
| 1010 | 4 | 1111 |
| 1001 | 4 | 1111 |
| 1000 | 3 | 0111 |
| 0111 | 3 | 0111 |
| 0110 | 3 | 0111 |
| 0101 | 3 | 0111 |
| 0100 | 2 | 0011 |
| 0011 | 2 | 0011 |
| 0010 | 1 | 0001 |
| 0001 | 0 | 0000 |
| 0000 | 4 | 1111 |

The list of digital words in the left-hand column an address word for each of the possible addresses in a system which contains four-bit addresses as in the present embodiment. The address words are arranged in the column from top to bottom in the order in which they appear at the output of address generator 103. The highest value address word "1111" appears on bus 103 when the last sample of an address group has its amplitude value presented at the output of signal source 100 on bus 101. The lowest valued address word "0000" appears on bus 103 when the last sample of an address group has its amplitude value presented on bus 101. The first sample to be transmitted from an address group requires all four bits in its transmitted address word. The next sample to be transmitted transmitted will still require four bits in its address word when the first sample was one of the first seven samples, as indicated in the center column of the table. When the first sample has an address word of "1000" or a later address word (i.e., one lower in value), less than four bits are required to indicate to the receiving location the location of the next sample in the address group. As indicated hereinabove, the last sample in an address group, that is, the sample with the address "0000," is forcibly transmitted in order to indicate to the receiver that the next sample will belong to a different address group. Accordingly, the number of bits required in the next address when the address word is "0000" is equal to four bits as indicated in he center column of the table.

In accordance with the present invention, only those bits of the address word which are required to locate the sample within an address grouping of samples are transmitted to the receiving location. The location of the required bits may be indicated by a control word having a logical "1" in the bit positions of the address which must be transmitted and a logical "0" in the bit positions of the address which need not be transmitted. The control word for each of the address words in the above table is given in the right-hand column of the table. For example, in the case where the address word is between "1000"and "0101", only three bits are required in the next address to indicate the location of the transmitted sample within the interval remaining between "1000" and the end of the address group. Accordingly, for the addresses "1000," "0101," and all of the addresses in between, the control word is "0111." Similarly, when the address word of a transmitted sample is "0100" or "0011" only the two least significant bits are required from the next address to indicate the location of the next sample in the remaining interval of the address group. Hence, the control word for these two address words is "0011." As indicated in the table, the address word "0010" indicates to the receiver that only one bit is necessary to locate the next transmitted sample within the interval remaining in the address group, and therefore the control word for this address is "0001." Finally, when the address of the transmitted sample is "0001" no bits are required to indicate the address of the remaining sample since there is only a single sample remaining in the sample group and that sample is always transmitted.

In FIG. 2 the control word derived from any given address word is stored in the data flip-flops 221 through 224 with the most significant bit of the control word being stored in data flip-flop 221 and the least significant bit of the control word being stored in data flip-flop 224. These data flip-flops are also of the type known to those skilled in the art as type "D" flip-flops. Data flip-flops 221 through 224 are designed so that each will initially provide a logical "1" at its output when the apparatus is activated for service. The first pulse on line 151, for example, can be utilized to set these flip-flops to the logical "1" state. Accordingly, the first sample to have its address and amplitude words coupled into data flip-flops 301–308 will be accompanied by a control word of "1111," indicating that all of the bits of the address word must be transmitted for this first sample.

As indicated hereinabove, the second sample selected for transmission out of an address group will in some cases not require the full complement of four bits in its address word. The number and location of the bits to be transmitted are given by the location of the logical "1's" in a control word established by the value of the last transmitted address. To establish the control word to be stored in data flip-flops 221 through 224 for use in conjunction with address of the next sample selected to be transmitted, a subtractor circuit 201 subtracts "0001" from the digital address word presented on lines 131 through 134. As indicated in the above table, the digital address word which is one step lower in value than the transmitted address word provides an indication by means of its most significant logical "1" as to the bit position of the most significant logical "1" in the control word to be stored for the next address. Hence, the digital word at the output of subtractor circuit 201 on lines 211 through 214 provides an indication as to the location of the most significant logical "1" in the control word to be used in conjunction with the next address. More specifically, the bit position of the most significant logical "1" in the digital word which is one lower in value than the transmitted address word is identical to the bit position of the most significant logical "1" in the control word for the next address.

If a logical "1" appears on output line 211 of subtractor circuit 201 it is coupled through OR gate 215 to the input of data flip-flop 221. It is also coupled from the output of OR gate 215 through OR gates 216, 217 and 218 to the inputs of data flip-flops 222, 223 and 224 respectively. The other input of OR gate 215 is connected to receive the energizing signal on line 138 when this signal is presented by the all-zeros detector 135. Hence, either the appearance of a logical "1" on line 211 or the presence of an energizing signal on line 138 will cause logical "1's" to appear at each of the inputs of data flip-flops 221 through 224. These logical "1's" will be coupled into storage into data flip-flops 221 through 224 when an energizing pulse is coupled to their clock inputs by way of line 250 from the output of AND gate 240.

If the subtraction performed by subtractor circuit 201 results in a digital word in which the most significant logical "1" appears in a bit position other than the most significant bit position, less than all four of the data flip-flops 221 through 224 will receive a logical "1" at their inputs providing there is not simultaneously present an energizing signal on line 138 from all-zeros detector 135. If line 212 has the most significant logical "1" only data flip-flops 222, 223 and 224 will be provided with logical "1's" at their inputs. If line 213 has the most significant logical "1" at the output of subtractor circuit 201, only data flip-flops 223 and 224 will be presented with a logical "1" at their inputs. If line 214 is the only line at the output of subtractor circuit 201 to have a logical "1," only data flip-flop 224 will be provided with a logical "1" at its input. If the digital word "0000" is provided on output lines 211 through 214 none of the data flip-flops 221 through 224 is provided with a logical "1" at its input. In this manner a control word having "0's" and "1's" in the positions indicated in the above table is established within data flip-flops 221 through 224 for every address word on lines 131 through 134 which is accompanied by the simultaneous presence of a transmit signal on line 150. As indicated hereinabove, this control word stored within data flip-flops 221 through 224 is then used in conjunction with the next address word presented on lines 131 through 134 to control which of the bits in this address word are read out of data flip-flops 301 through 304.

Line 250 carrying the energizing pulse is also connected to one input of each of the AND gates 310 through 314 in FIG. 3. The output of each of the AND gates 310 through 314 is connected to one cell of a flag shift register 320. During the instant when a transmit signal is provided on line 150, one, and only one, of the AND gates 310 through 314 will provide a logical "1" to its respective cell on flag shift register 320. The particular AND gate which supplies the logical "1" to the flag shift register will be chosen on the basis of the control word stored in data flip-flops 221 through 224. If a logical "1" is present at the output of data flip-flop 221, this logical "1" energizes a second input of AND gate 310 by way of line 321 and the energizing pulse on line 250 causes a logical "1" to be entered from AND gate 310 into the first cell of flag shift register 320.

The energizing pulse on line 250 is coupled through delay network 333 to the trigger input of a pulse generator 332. The delay introduced by delay network 333 need only be long enough to permit the logical "1" to be inserted into one of the first five cells of shift register 320 by the AND gate which has been selected to be energized by the control word. In response to receiving an energizing pulse at its trigger input, pulse generator 332 produces a sequence of eight voltage pulses at the shift input of flag shift register 320. These eight voltage pulses are provided by generator 320 at a high enough repetition rate such that the information stored in the first cell of shift register 320 is shifted through all eight cells before the appearance of the next energizing pulse on line 151. Accordingly, when AND gate 310 inserts a logical "1" into the first cell of shift register 320, the voltage pulses from the output of pulse generator 332 shift the logical "1" present in cell 1 through cells 1 through 8 in flag shift register 320 before the appearance of a next energizing pulse on line 151.

The output of each of the cells 1 through 8 of flag shift register 320 is connected to one input of one of the AND gates 341 through 348. The other input of each of the two input AND gates 341 through 348 is connected to the output of one of the data flip-flops 301 through 308. The output of each of the AND gates 341 through 348 is coupled through OR gate 350 to the input of a buffer memory 351. When a logical "1" is provided by a cell of flag shift register 320 to the input of its corresponding AND gate, the output of the data flip-flop corresponding to that AND gate is coupled through that AND gate and OR gate 350 into buffer memory 351. Accordingly, by shifting the logical "1" in cell 1 of flag shift register 320 through all of the cells 1 through 8, the outputs of data flip-flops 301 through 308 are coupled in time sequence through OR gate 350 into buffer memory 351.

In the case where the control word stored flip-flops through 224 that less than all of the bits of the address word should be red out of data flip-flops 301 through 304, one or more of the data flip-flops 301 through 304 will contain information which is not to be coupled through to the buffer memory 351. For example, when a logical "1" is not present in data flip-flop 221, data flip-flop 301 should not be read out into buffer memory 351. To provide this type of operation an exclusive OR gate, having one input connected to the output of flip-flop 221 and the other input connected to the output of data flip-flop 222, provides a logical "1" output when a logical "0" is provided at the output of data flip-flop 221 and a logical "1" is provided at the output of data flip-flop 222. Similarly, exclusive OR gates 226 and 227 are connected to the outputs of data flip-flops 222, 223 and 224 to provide at their respective outputs logical "1's" when their inputs are presented with dissimilar logical signals.

The output of exclusive OR gate 225 is connected by way of line 322 to an input of AND gate 311. If exclusive OR gate 225 provides an output logical "1" simultaneously with the appearance of an energizing pulse on line 250, AND gate 311 will couple a logical "1" into the second cell of flag shift register 320. This logical "1" inserted into the second cell of flag shift register 320 is then shifted through cells 2 through 8 in response to the voltage pulses at the output of pulse generator 332. As a result, only the information stored in data flip-flops 302 through 308 are coupled through OR gate 350 to the input of buffer memory 351. The information stored in data flip-flop 301 is not needed and in therefore not coupled through to buffer memory 351 since a logical "1" in this instance is never present in the first cell of flag shift register 320.

In a similar fashion, a logical "1" output from either of the exclusive OR gates 226 or 227 causes a logical "1" to be inserted into either cell 3 or cell 4 of flag shift register 320 when an energizing pulse is provided on line 250. Where the logical "1" is inserted into cell 3, the information stored in data flip-flops 301 and 302 (and in data flip-flop 303 where the logical "1" is inserted into cell 4) is not coupled through to buffer memory 351.

Finally, when the control word stored in data flip-flops 221 through 224 has logical "0's" in all of its bit positions, the logical "0" at the output of data flip-flop 224 causes an inhibit input of AND gate 314 to be activated by way of line 325. As a result, AND gate 314 in this instance causes the energizing signal provided by an energizing pulse on line 250 to be coupled into cell 5 of flag shift register 320. As a result, only the amplitude information stored in data flip-flops 305 through 308 is coupled through OR gate 350 into buffer memory 351. This amplitude information is the amplitude for the last sample in a sample group and, as indicated hereinabove, no address is necessary to locate this sample within the sample grouping providing that the sample with the address word "0001"has been transmitted. It should be noted that the last sample in the address group was advantageously chosen in accordance with the present invention to be forcibly transmitted in order to maintain group synchronization between the transmitting and receiving locations. Since this particular sample will require on the average fewer address bits than other samples in the group, it is far more efficient to utilize this sample as a synchronizing word than to utilize one of the other samples.

The digital words stored in buffer memory 351 are out and coupled by way of a digital transmitter 352 into a transmission channel 360. A count of the number of bits stored in buffer memory 351 is maintained by a counter circuit 353. The value of this count is coupled by way of bus 137 to an input of selector apparatus 108. As indicated hereinabove, the value of this digital word provided on bus 137 is utilized to control the threshold level within selector apparatus 108. When a large number of bits are stored in buffer memory 351, the large valued digital word provided on bus 137 by counter 353 causes a larger threshold level to be established within selector apparatus 108. As a result, fewer samples are deemed to represent significant changes and therefore the rate at which bits are provided to the input of buffer memory 351 will be decreased. On the other hand, when the number of bits stored within buffer memory 351 is indicated by counter 353 to be very low, the threshold level within selector apparatus 108 is lowered thereby causing a lower amplitude change to be labeled as a significant change. In this way buffer memory overflow and underflow is controlled by varying the threshold level within selector apparatus 108.

Digital transmitter 352 is synchronized to the sample rate provided by the signal source 100 by way of line 152 such that the bit stream provided on transmission channel 360 occurs at a rate which bears a functional relationship to the sampling rate in signal source 100. This is a standard technique utilized in PCM systems for maintaining synchronization between a transmitting and receiving apparatus.

Figures 4, 7:
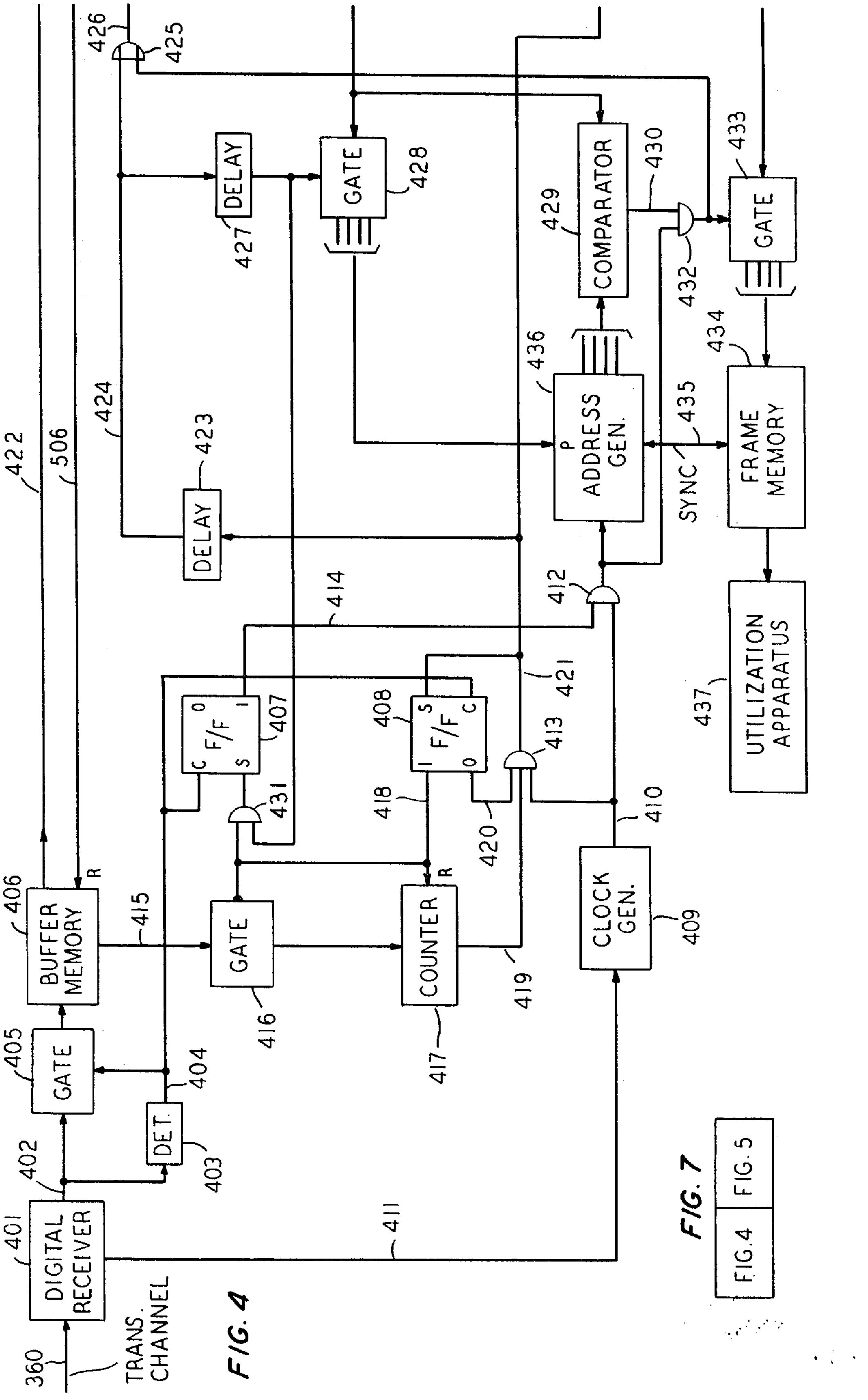
FIGS. 4 and 5 when placed end to end in accordance with the pattern shown in FIG. 7 provide a schematic block diagram of receiving apparatus constructed in accordance with the present invention.

The stream of data bits on transmission channel 360 is coupled to the input of a digital receiver 401 in FIG. 4. Digital receiver 401 processes the bit stream from transmission channel 360 so as to provide a digital signal at the output of the receiver which is identical to the digital bit stream provided to the input of digital transmitter 352. In order to indicate to the receiving apparatus that information or data is forthcoming on transmission channel 360, digital transmitter 352 precedes the data bit stream with a unique synchronization word. The appearance of this synchronization word at the output of receiver 401 is detected by a detector circuit 403. In response to this synchronization word, detector circuit 403 provides an energizing signal at its output. This energizing signal activates the control input of a transmission gate 405. With transmission gate 405 activated the digital bit stream at the output of receiver 401 is permitted to pass through the transmission gate to the input of a buffer memory 406. In addition, the transient rise which takes place when detector circuit 403 produces an energizing signal is utilized to energize the clear inputs of flip-flops 407 and 408.

A clock generator 409 provides energizing pulses on line 410 at a rate identical to the rate at which samples are provided at the output of signal source 100 in FIG. 1. This identity of rates is maintained by a synchronization link 411 connected between the digital receiver 401 and the clock generator 409. With flip-flop 407 in its cleared state, an energizing signal is not provided by flip-flop 407 to one of the inputs of an AND gate 412 and, therefore, the energizing pulses at the other input of AND gate 412 from the output of clock generator 409 are initially not permitted to pass through AND gate 412 to the input of an address generator 436.

Figure 5:
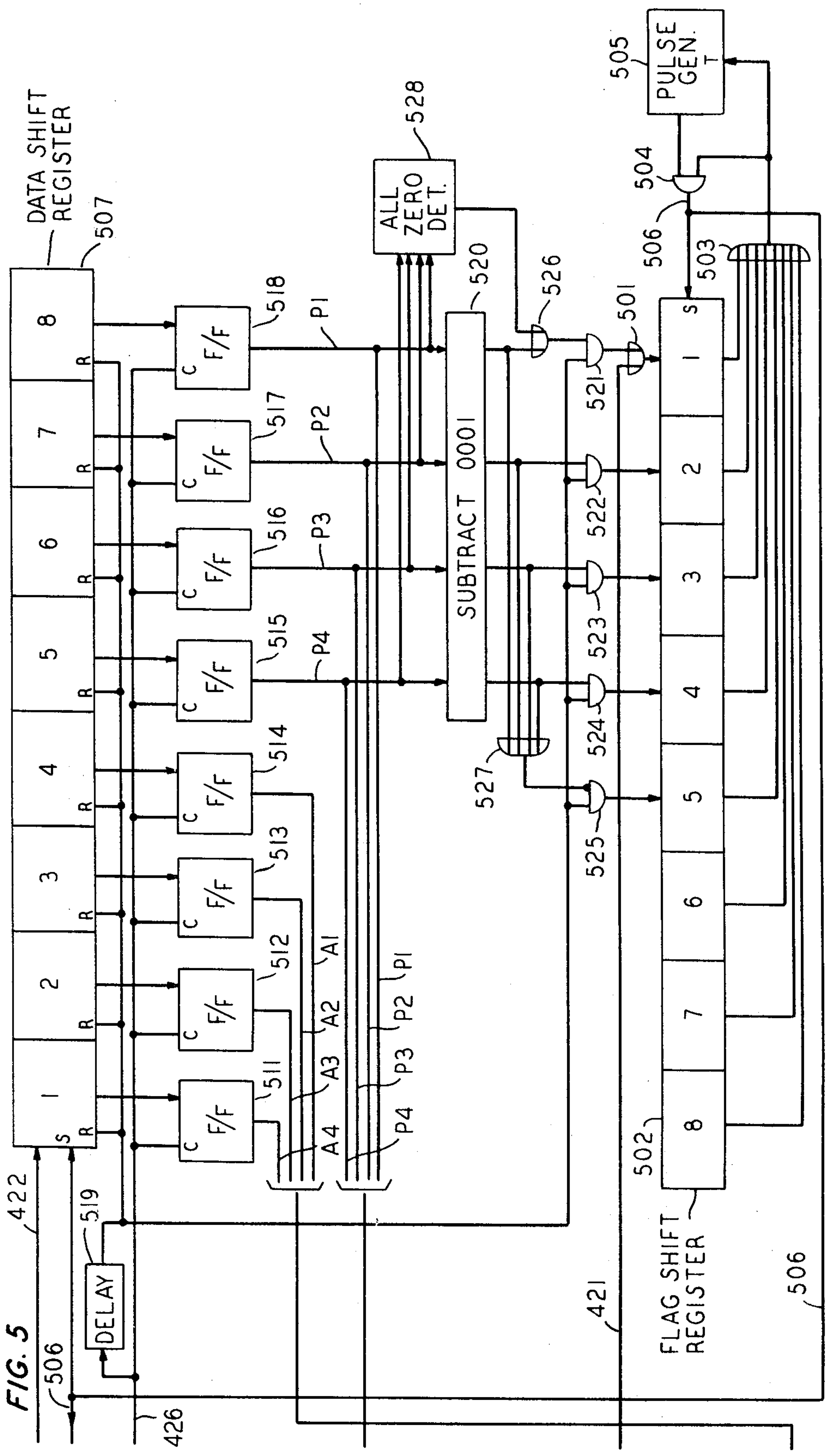

Buffer memory 406 provides an energizing pulse to the input of a transmission gate 416 upon the receipt of each digital bit into buffer memory 406. With flip-flop 408 in its cleared state, no energizing signal is provided by flip-flop 408 to the inhibit input of the transmission gate 416 and, therefore, the energizing pulses from buffer memory 406 are coupled through transmission gate 416 to the input of a counter circuit 417. Since counter circuit 417 has been previously reset to a zero state, in a manner to be described hereinbelow, the quantity registered in counter circuit 417 provides an indication as to the number of bits received and stored within buffer memory 406. When the number of bits stored in buffer memory 406 is equal to the total number of bits capable of being stored in buffer memory 351 of FIG. 3, counter circuit 417 is constructed so as to provide an energizing signal at its output on line 419. This energizing signal energizes one input of an AND gate 413, a second input of which is connected to receive the energizing pulses on line 410 out of clock generator 409. A third input of AND gate 413 is connected to receive the energizing signal produced by flip-flop 408 when the latter has been set to its cleared state. Hence, the first clock pulse to appear at the output of clock generator 409 after an output is produced by counter 417 is coupled through AND gate 413 to the input of a delay circuit 423 and by way of line 421 through an OR gate 501 in FIG. 5 into the first cell of a shift register 502.

With an energizing signal present in any one of the cells of shift register 502, this energizing signal is coupled from the cell through an OR gate 503 to one input of an AND gate 504 and to the trigger input of a pulse generator 505. In response to receiving an energizing signal at its trigger input, pulse generator 505 produces a series of eight voltage pulses at its output. The other input of AND gate 504 is connected to receive the output voltage pulses from pulse generator 505. Consequently, when an energizing signal is present in any one of the cells of shift register 502, the voltage pulses out of pulse generator 505 are coupled through AND gate 504 to the shift input of shift register 502 by way of line 506. These pulses from pulse generator 505 will continue to be coupled through AND gate 504 until the energizing signal has been shifted out of the eighth cell of shift register 502. Accordingly, when the energizing pulse from AND gate 413 is coupled through OR gate 501 into the first cell, all eight voltage pulses are permitted to pass from pulse generator 505 through AND gate 504 to the shift input of shift register 502.

Line 506 at the output of AND gate 504 is also connected by way of line 506 to the read input of buffer memory 406 and also to the shift input of a data shift register 507. Consequently, eight voltage pulses on line 506 cause eight digital bits to be read out of buffer memory 406 into the eight cells of data shift register 507 by way of line 422. These eight bits contain the amplitude and address information for the first sample selected for transmission in the transmitting location. As indicated hereinabove, this first sample will always have four bits of address information associated with the four bits of amplitude information.

After a delay equal in duration to the interval between adjacent clock pulses from clock generator 409, the energizing pulse out of AND gate 413 appears at the output of delay circuit 423. This delayed clock pulse is coupled through OR gate 425 to the clock inputs of the data flip-flops 511 through 518 by way of line 426. Each cell in data shift register 507 has its output connected to the input of a corresponding one of the data flip-flops 511 through 518. The appearance of the delayed energizing pulse on line 426 at the clock inputs of these data flip-flops causes the information stored in data shift register 507 to be transferred into data flip-flops 511 through 518. As a result, the output of data flip-flops 511 through 514 represents the digital word-providing amplitude information for the first transmitted sample with the most significant bit A1 present at the output of data flip-flop 514, whereas the digital word at the output of data flip-flops 515 through 518 corresponds to the address word of the first transmitted sample with the most significant bit P1 present at the output of data flip-flop 518.

The energizing pulse out of OR gate 425 is also coupled to the input of a delay circuit 519. Delay circuit 519 provides a predetermined amount of delay substantially less than the interval between two adjacent clock pulses out of clock generator 409. The delay provided by circuit 519 need only be sufficiently long so as to permit the digital word "0001" to be subtracted from the digital outputs of data flip-flops 515 through 518 by a subtractor circuit 520. The delayed energizing pulse out of delay circuit 519 is coupled to the reset inputs of all eight cells in data shift register 507, thereby causing each of the cells to be reset to the logical "0" state. In addition, the delayed energizing pulse out of delay circuit 519 is connected to one input of each of a plurality of AND gates 521 through 525. The other input of each of the AND gates 521 through 524 is connected to receive one of the bits from the digital word provided at the output of subtractor circuit 520. Hence, the appearance of an energizing pulse at the output of delay circuit 519 normally causes the output digital word from subtractor circuit 520 to be coupled through AND gates 521 through 524 into cells 1 through 4 of a flag shift register 502.

As indicated hereinabove, the position of the most significant logical "1" in a digital word one less in value than the transmitted address will in all cases, except for the last sample in a sample grouping, provide an indication as to the number of bits required in the next transmitted address. Hence, in all cases, except in the case of the last sample in a sample grouping, the digital word coupled from subtractor circuit 520 through AND gates 521 through 524 into cells 1 through 4 of flag shift register 502 will result in the production of voltage pulses on line 506 equal in number to the total number of bits expected in the next sample. These voltage pulses on line 506 energize both the read input of buffer memory 406 and also the shift input of data shift register 507, thereby causing the digital bits corresponding to the next sample to be read out of the buffer memory into shift register 507.

The delayed energizing pulse out of delay circuit 423 is also coupled to a delay circuit 427. Delay circuit 427 provides a delay substantially equal to the delay provided by the above-mentioned delay circuit 519. The delay provided by delay circuit 427 need only be long enough in duration so as to permit the information stored in data shift register 507 to be transferred into data flip-flops 511 through 518 by the pulse-out of OR circuit 425. The digital bits corresponding to the address word, that is, the outputs of data flip-flops 515 through 518, are coupled to the input of a transmission gate 428. The delayed energizing pulse at the output of delay circuit 427 energizes transmission gate 428 so as to couple the address digital bits through gate 428 to the preset input of the address generator 436. In response to receiving these digital bits, the address generator presets to the point in its cycle at which it provides the address corresponding to these bits at its output. After being preset, address generator 436 will respond to each pulse coupled to its input from AND gate 412 by changing the digital word at its output to provide a sequence of digital words identical to hat which is provided by address generator 102 in FIG. 1.

The address digital word from flip-flops 515 through 518 is also coupled to one input of a comparator circuit 429, and the other input of the comparator circuit 429 is connected to receive the output of the address generator 436. Since in this instance, that is, for the first sample, these two address digital words have been forced to be identical, comparator circuit 429 will immediately provide an energizing signal at its output on line 430.

The delayed energizing pulse out of delay circuit 427 is also coupled to one input of an AND gate 431, the other input of which is connected to the "1" output of flip-flop 408. At the instant when the pulse occurs out of delay circuit 427, this other input of AND gate 431 is energized by the signal provided at the "1" output of flip-flop 408 since the latter circuit has been previously set by the energizing pulse at the output of AND gate 413. Consequently, the energizing pulse from delay circuit 427 passes through AND gate 431 to the set input of flip-flop 407. With flip-flop 407 in its set state, AND gate 412 is prepared to be energized by the next energizing pulse out of clock generator 409. This next pulse out of generator 409 is coupled through AND gate 412 to one input of an AND gate 432, the other input of which is connected to line 430, the output of comparator circuit 429. In this initial instance where comparator circuit 429 has been provided with identical digital words at its two inputs, the clock pulse from generator 409 at one input of AND gate 432 will immediately be coupled through this AND gate to the control input of a transmission gate 433 and also to one input of OR gate 425. When transmission gate 433 is energized the amplitude digital word present at the outputs of data flip-flops 511 through 514 is coupled through gate 433 to the input of a frame memory 434. The proper location for this amplitude word within frame memory 434 is insured by the synchronization link 435 connected between the address generator and frame memory 434.

The above-mentioned clock pulse which is coupled through AND gate 432 is also coupled through OR gate 425 to the clock inputs of data flip-flops 511 through 518, thereby causing information from the next sample which has already been stored in data shift register 507 to be coupled into the data flip-flops 511 through 518. A short predetermined interval later, determined by the delay of delay circuit 529, the digital bits from the next sample will be coupled out of buffer memory 406 into the cells of data shift register 507. The number of bits coupled is of course determined by the digital word presented at the output of subtractor circuit 520.

After flip-flop 408 is set by the energizing signal at the output of AND gate 413 it no longer provides an energizing signal from its "0" output to one input of AND gate 413. Accordingly, only one clock pulse from clock generator 409 is permitted to be coupled through AND gate 413 into delay circuit 423. Consequently, this path will no longer provide, after the initial synchronizing phase, an energizing pulse out of delay circuit 423 through OR gate 425 to the clock inputs of data flip-flops 511 through 518. After the initial synchronizing phase, an energizing clock pulse can only be provided to these clock inputs by AND gate 432.

Comparator circuit 429 only provides an energizing signal at its output on line 430 when the digital words presented to its two inputs are identical. Hence, if the second sample which is stored in data flip-flops 511 through 518 corresponds the the sample in the address location immediately adjacent to that of the first sample, comparator circuit 429 will immediately provide an energizing signal at its output thereby permitting the next clock pulse from clock generator 409 to be coupled through AND gate 432 to the clock inputs of data flip-flops 511 through 518. If, however, the second sample which is stored in data flip-flops 511 through 518 does not correspond to the next adjacent sample in the address grouping, comparator circuit 429 will wait until the address generator 436 provides the address digital word corresponding to the address stored in data flip-flops 515 through 518 before providing the energizing signal to AND gate 432. In this way the amplitude information stored in data flip-flops 511 through 514 remains stored in these data flip-flops until the proper address is provided at the output of the address generator 436. As a result, the amplitudes are placed in the proper locations within frame memory 434.

In the instance where the address digital word of data flip-flops 515 through 518 is equal to "0001," subtractor circuit 520 will provide a logical "0" in each bit position at its output. Each of the output bits of subtractor circuit 520 is connected through an OR gate 527 to the inhibit input of AND gate 525. In this instance none of the AND gates 521 through 524 will be energized by an output from subtractor circuit 520, and, therefore, the delayed energizing pulse from the output of delay circuit 519 is coupled through AND gate 525 into the fifth cell of flag shift register 502. A logical "1" in the fifth cell will result in four voltage pulses on line 506. This will of course permit only four digital bits to be coupled from buffer memory 406 into data shift register 507. These four digital bits are all that is necessary since the next sample after the "0001" address to be coupled out of memory 406 corresponds to the amplitude of the last sample in an address group. As indicated hereinabove, this sample is forcibly transmitted during each address grouping and no address bits are required to locate this sample within the address group when the sample corresponding to the address "0001" has been transmitted.

When this last sample from the address grouping is transferred from data shift register 507 into data flip-flops 511 through 518, all of the data flip-flops 515 through 518 have logical "0's" in storage. This fact is recognized by an all-zeros detector 528 which has its inputs connected to the outputs of data flip-flops 515 through 518. In response to a logical "O" at the output of each of the data flip-flops 515 through 518, the all-zeros detector 528 provides an energizing signal to one input of an OR gate 526. This energizing signal is coupled through OR gate 526 to one input of AND gate 521. Accordingly, when the delayed energizing pulse appears at the output of delay circuit 519 the energizing signal from the output of the all-zeros detector 528 will permit this pulse to enter a logical "1" into the first cell of flag shift register 502. As indicated hereinabove, a logical "1" in the first cell results in the coupling of eight digital bits out of buffer memory 406 into data shift register 507. This is precisely equal to the number of bits required in the next sample in the case where the last sample transmitted corresponds to the last sample in an address grouping.

The information stored in frame memory 434 is updated in accordance with the amplitude information coupled through gate 433 into frame memory 434. This information is coupled out of frame memory 434 to the utilization apparatus 437. In the case of a video system this utilization apparatus would consist of a digital-to-analog encoder and a display apparatus such as a kinescope. In the case of a telemetry system the utilization apparatus may be simply a digital-to-analog encoder, a demultiplexer, and some means of displaying the analog information acquired from each telemetry sensor at the transmitting location.

I claim:

1. A redundancy reduction transmission system comprising means for generating a plurality of first digital words each one of which has a value which indicates the sampled amplitude of an input signal, means for generating a plurality of second digital words each one of which has a value which indicates the position of its corresponding first digital word in a predetermined group of samples of said input signal, means for selecting one of said first digital words for transmission, and a memory means responsive to said selecting means for storing the selected one of said first digital words and its corresponding second digital word, characterized in that a means for reading out digital bits stored in said memory means couples all of the digital bits of the selected first digital word and selected bits of its corresponding second digital word to a digital transmitter, the selection of bits from said second digital word being based on the interval between the location of a previously transmitted first digital word in said group of samples and the end of said group.

2. A redundancy reduction transmission system as defined in claim 1 wherein said means for reading out digital bits stored in said memory means includes means responsive both to said means for selecting and to the second digital word corresponding to said selected first digital word for developing and storing a control word the value of which indicates the bits to be coupled to said digital transmitter from a subsequent second digital word corresponding to a next selected first digital word.

3. A redundancy reduction transmission system as defined in claim 2 wherein said means for reading out digital bits stored in said memory means includes a means responsive to said control word for selectively reading out the digital bits of the second digital word stored in said memory means.

4. A redundancy reduction transmission system as defined in claim 2 wherein said means for developing and storing a control word includes means for subtracting a predetermined value from said second digital word corresponding to said first digital word selected for transmission, means responsive to the output of said subtracting means for developing a digital control word having digital bits of one value both in the bit position having the most significant logical "1" at the output of said subtracting means and in lower valued bit positions, and a second memory means for storing the digital control word developed by said means responsive to the output of said subtracting means.

5. A redundancy reduction transmission system as defined in claim 4 wherein said means for reading out digital bits stored in said first-mentioned memory means includes a means responsive to said digital control word for selectively reading out the digital bits of the second digital word stored in said first-mentioned memory means.

6. In a redundancy reduction system in which selected samples of an input signal are transmitted to a receiving location, apparatus for indicating the location of each transmitted sample within a predetermined group of samples comprising means for generating a digital address word for each sample the value of which word indicates the length of the interval between said each sample and the end of said group, means responsive to said address word for indicating the number of bits required to locate a subsequent sample in the interval between said each sample and the end of said group, and means responsive to said indicating means for selectively rejecting most significant bits in the address word corresponding to said subsequent sample.

7. Apparatus as defined in claim 6 wherein said means for indicating the number of bits required to locate a subsequent sample includes means for subtracting a predetermined value from said digital address word to provide a lower valued address word, and means responsive to said lower valued address word for developing a control word having a digital bit of one value both in the same bit position as the most significant logical "1" in said lower valued address word and in all lower valued bit positions and having a digital bit of the opposite value in the remaining bit positions.

8. Apparatus as defined in claim 7 wherein said means for selectively rejecting most significant bits includes a memory means for storing said control word, and a means responsive to said memory means for selectively coupling only those bits of an address word which correspond to the bit positions in said control word having said digital bit of one value.

9. In a redundancy reduction system wherein each sample of an input signal is accompanied by an address word which indicates the position of its sample in a group of samples, apparatus for reducing the number of bits required to be transmitted for the purpose of addressing a sample selected for transmission comprising means for subtracting a predetermined value from a first address word to produce a lower valued word, means responsive to said lower valued word for generating a control word having a value which indicates the bit positions to be transmitted from a subsequent address word, means for storing said control word, and means responsive to said control word for selectively coupling bits from a subsequent address word to a digital transmitter.

10. Apparatus as defined in claim 9 wherein said predetermined value is equal to one and said means for generating a control word includes means responsive to said lower valued word for providing a digital word having a digital bit of one value both in the bit position of said lower valued word having the most significant logical "1" and in lower valued bit positions.

11. Apparatus as defined in claim 10 wherein said means for selectively coupling bits from a subsequent address word includes a plurality of exclusive OR gates equal in number to one less than the number of bit positions in said control word.

12. Receiving apparatus in a redundancy reduction system for separating samples from a serial bit stream, each sample having an amplitude digital word preceded by an address digital word with a variable number of bits, a buffer memory means for storing said serial bit stream, a data shift register connected to said buffer memory means for receiving digital bits read out of said buffer memory means, data memory means for storing the digital bits present in said data shift register in response to a control signal at its clock input, means responsive to a digital word stored in predetermined areas of storage in said data memory means for generating said control signal, means responsive to said control signal for resetting said data shift register, and means responsive to the resetting of said data shift register for reading out a plurality of bits from said buffer memory means, the number of bits read out being a function of the digital word stored in said predetermined areas of storage in said data memory means.

13. In receiving redundancy reduction apparatus as defined in claim 12 wherein said means for reading out a plurality of bits from said buffer memory means includes means for subtracting a predetermined value from said digital word stored in said predetermined areas of storage to produce a lower valued digital word, and means responsive to the resetting of said data shift register for generating a plurality of voltage pulses, the number of pulses being determined by the value of said lower valued digital word.

14. Receiving apparatus in a redundancy reduction system for replenishing a frame memory with samples from a serial bit stream, each sample having an amplitude digital word preceded by an address digital word with a variable number of bits, a buffer memory means for storing said serial bit stream, a data shift register for receiving digital bits read out of said buffer memory means, data memory means for storing the digital bits present in said data shift register in response to a control signal at its clock input, an address generator for periodically providing a memory address digital word which indicates a position in said frame memory available for replenishment, means for generating said control signal when a match is obtained between said memory address digital word and the digital bits stored in predetermined areas of storage in said data memory means, means responsive to said control signal for resetting said data shift register, means responsive to the digital bits stored in said predetermined areas of storage in said data memory means for developing a control word the value of which indicates the number of bits present in the next sample to be coupled out of said buffer memory means, and means responsive to the resetting of said data shift register and to said control word for reading out the number of bits indicated by said control word from said buffer memory means.

15. Apparatus as defined in claim 14 wherein said means for developing a control word includes means for subtracting a predetermined value from the digital bits stored in said predetermined areas of storage.

16. Apparatus as defined in claim 15 wherein said means for reading out the number of bits indicated by said control word from said buffer memory means includes means for generating a plurality of voltage pulses, the number of pulses being determined by the value of said control word.